Feb. 17, 1970   D. C. ACHILLES ET AL   3,496,564
DISCRETE DATA INDICATOR
Filed Aug. 3, 1967

INVENTORS.
DAVID C. ACHILLES
MICHAEL D. DEVLIN
BY R H Quist
ATTORNEY.

United States Patent Office 3,496,564
Patented Feb. 17, 1970

3,496,564
DISCRETE DATA INDICATOR
David Carlton Achilles and Michael David Devlin, Daytona Beach, Fla., assignors to General Electric Company, a corporation of New York
Filed Aug. 3, 1967, Ser. No. 658,172
Int. Cl. G08b 5/00
U.S. Cl. 340—378
3 Claims

ABSTRACT OF THE DISCLOSURE

A housing with a transparent front face contains a removable, transparent strip having a legend in a first color visible through the front face of the housing. A meter movement in the housing can be positioned to provide a background for the legend in a matching color (to obscure the legend), or a contrasting color (to make the legend apparent).

BACKGROUND OF THE INVENTION

This invention is a device for indicating on a display panel either of two states or conditions of a piece of equipment or the like.

Complex systems such as power generating stations or launch vehicles have many active components which must all operate in a prescribed manner if the system as a whole is to operate correctly. To effectively monitor and control such a system a display is provided which provides information about the condition of the system. One form of such information is denoted discrete data. Discrete data is used for example, to indicate whether a motor is operating or stopped, or whether a valve is open or closed.

It is customary to display such discrete data by a legend indicating the nature of the information such as: MAIN EXHAUST ON. This legend is illuminated from behind to indicate functioning and not illuminated to illustrate the other state. A problem with this arrangement is that with a large display, the many lights used consume a great deal of power, much of which is dissipated as heat. Moreover it is inconvenient to change the light bulbs, and even the legends, with the presently used equipment.

SUMMARY

It is an object of this invention to provide a discrete data indicator which does not require the use of lamps, consumes little power, and permits convenient changing of the legends.

In a preferred form of the invention, a housing molded of transparent plastic is designed to receive a transparent strip having a legend in a first color. A cylindrical background element contained in the housing has one portion of its outer surface in the first color and a second portion in a second color. The cylindrical background element is a part of a crude but rugged meter movement enabling the cylinder to be positioned so that one or the other colored portions is immediately behind the legend strip. When the background is the same color as the legend, the legend is not apparent; however, when the background is of a contrasting color the legend becomes evident. The illumination in the room normally is sufficient to readily read the legend with the contrasting background.

The housing of the discrete data indicator is designed to permit stacking of the indicators. The legend strip for an entire stack of these indicators can be changed merely by slipping out the old strip and inserting a new one.

DESCRIPTION OF THE PREFERRED EMBODIMENT

Figure 1:
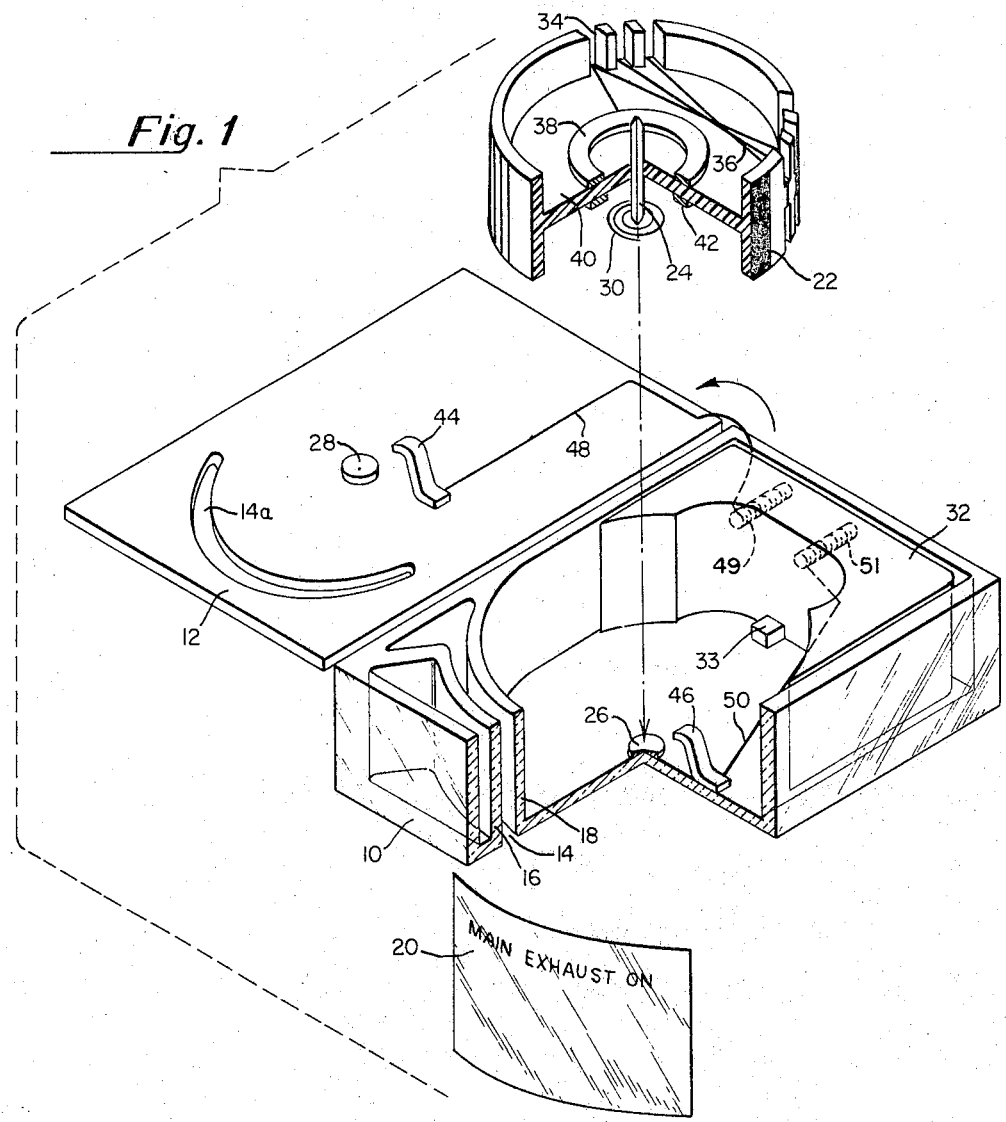
FIGURE 1 is isometric, half section, exploded view of one embodiment of the invention.

Referring to FIGURE 1, housing 10, together with detachable top 12, are molded of a transparent material. Vertical passage 14, defined by walls 16 and 18, is designed to contain transparent strip 20 having a legend thereon in a first color as illustrated.

Top 12 is constructed with opening 14a aligned with vertical passage 14 so that transparent strip 20 can be changed (to have a new legend) without removing top 12 from housing 10.

Rotatable cylinder 22 supported by vertical shaft 24 is mounted in housing 10. Bearing point 26 on the base of housing 10 and bearing point 28 on top 12, are designed to receive the pointed ends of shaft 24 so as to minimize frictional resistance to the rotation of cylinder 22.

Figure 2:
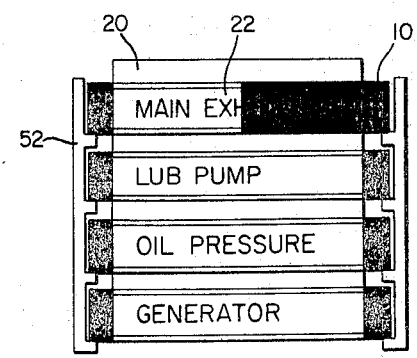
FIGURE 2 is a front elevation of a panel employing several of the discrete data indicators of FIGURE 1.

It should be noted that with the arrangement thus far described, a portion of the outer surface of cylinder 22 will be a background for transparent strip 20 when viewed through the front face of housing 10. If the legend on transparent strip 20 were black and the outer surface of cylinder 22 were white, it can be appreciated that the legend would be apparent. If, on the other hand, the outer surface of cylinder 22 were black, the legend would blend with its background and be obscure. This is illustrated by FIGURE 2 in which transparent legend strip 20 is positioned in front of cylinder 22 with a portion of the surface of cylinder 22 white and another portion black.

In the general case, a first portion of the outer surface of cylinder 22 is of a second color, contrasting with the first color of the legend; and a second portion of the outer surface of cylinder 22 is of the first color. Cylinder 22 is positioned normally in housing 10 by damping spring 30 so as to provide a background of either the first or the second color, as desired. In order to change the background to the other color the means next to be described is utilized.

Permanent magnet 32 is positioned in housing 10 by block 33 so as to be adjacent to cylinder 22. Cylinder 22 has slots 34 cut on top and bottom so that coil 36 can be wound thereon. One end of coil 36 is connected to wiper surface 42 on the bottom of hub 40.

Top wiper 44, secured to top 12, makes an electrical connection with wiper surface 38 when top 12 is in position on housing 10. In a similar manner bottom wiper 46, secured to housing 10, makes an electrical connection with wiper surface 42. Conductor 48 connects wiper 44 to terminal 49 on the rear of housing 10, and conductor 50 connects wiper 46 to terminal 51 at the rear of housing 10. By applying a suitable direct current to the terminals, coil 36 is energized, and due to the magnetic field of magnet 32, a deflecting torque is produced causing cylinder 22 to rotate. By this means the background is changed from one color to another.

In addition to the two color arrangement described above, a three color embodiment may be employed using a current through coil 36 in the reverse direction to position the third color as a background. This arrangement may be desired to positively signal both conditions of an equipment rather than using the lack of a current to signal one condition. Cylinder 22 in FIGURE 1 illustrates such a three color arrangement.

Referring again to FIGURE 2, stand 52 is illustrated which supports four housings 10. Rather than providing separate legend bearing strips for each housing, however, a common transparent strip 20 is provided for the stack. It is evident that in lieu of stand 52 other supporting structures for housings 10 could be substituted to increase the number of housings 10 in a stack and to provide similar stacks positioned side by side. In this manner a panel having any desired number of discrete data indicators can be constructed.

While a particular embodiment of a discrete data indicator has been shown and described, it will be obvious that changes and modifications can be made without departing from the spirit of the invention.

What is claimed as new and desired to be secured by Letters Patent of the United States is:

1. A discrete data indicator comprising:
    a housing having a transparent front face,
    a transparent strip having a legend thereon in a first color,
    a vertical passage in said housing adapted to contain said strip so that said legend is visible through said transparent front face,
    a background element for said strip constituting a rotatable cylinder supported on a vertical shaft contained in said housing,
    said cylinder having a first portion of its outer surface of said first color and a second portion of its outer surface of a second contrasting color,
    a magnet positioned in said housing adjacent to said cylinder, and
    a coil wound on said cylinder, whereby said rotatable cylinder can be moved to at least one position by energizing said coil in a first direction, thereby said legend is readable when said second contrasting color portion of the outer surface of said cylinder is moved behind said legend and not readable when said first color portion of the outer surface of said cylinder is moved behind said legend.

2. A discrete data indicator according to claim 1 wherein:
    said transparent strip is elongated and has legends thereon for a plurality of discrete data indicators.

3. A discrete data indicator according to claim 1 wherein:
    the outer surface of said cylinder has a third portion of a third contrasting color, and
    said cylinder can be moved to a second position by energizing said coil in the opposite direction.

References Cited

UNITED STATES PATENTS

| | | | |
|---|---|---|---|
| 1,647,894 | 11/1927 | Wasserkampf | 340—378 |
| 1,902,497 | 3/1933 | Green. | |
| 2,009,209 | 7/1935 | Scantleburg. | |
| 2,415,452 | 2/1947 | Taylor et al. | 340—373 |
| 2,836,773 | 5/1958 | Skrobisch | 340—373 X |
| 2,854,607 | 9/1958 | Niklas et al. | 335—222 X |
| 3,025,512 | 3/1962 | Bloechl | 340—373 |
| 3,232,401 | 2/1966 | Jones | 116—129 X |

LOUIS R. PRINCE, Primary Examiner

DANIEL M. YASICH, Assistant Examiner

U.S. Cl. X.R.

40—115; 116—129; 340—373